(No Model.) 2 Sheets—Sheet 1.

A. T. CWERDINSKI.
SPARK ARRESTER.

No. 391,838. Patented Oct. 30, 1888.

Attest:
T. W. Sanford
C. T. Biser

Inventor:
Alphonse T. Cwerdinski
by C. D. Moody, atty.

(No Model.) 2 Sheets—Sheet 2.

A. T. CWERDINSKI.
SPARK ARRESTER.

No. 391,838. Patented Oct. 30, 1888.

Attest:
J. W. Crawford
C. T. Biser

Inventor:
Alphonse T. Cwerdinski
by C. D. Moody, atty.

UNITED STATES PATENT OFFICE.

ALPHONSE T. CWERDINSKI, OF ST. LOUIS, MISSOURI.

SPARK-ARRESTER.

SPECIFICATION forming part of Letters Patent No. 391,838, dated October 30, 1888.

Application filed November 4, 1887. Serial No. 254,314. (No model.)

*To all whom it may concern:*

Be it known that I, ALPHONSE T. CWERDINSKI, of St. Louis, Missouri, have made a new and useful Improvement in Spark-Arresters, of which the following is a full, clear, and exact description.

The present invention is an improved means for arresting the sparks of a locomotive and preventing them from escaping from the locomotive-stack.

It consists in arranging a deflector in the smoke-arch in front of the flue-sheet of such a shape and in such a position as to intercept the sparks and divert them into a receptacle, chamber, or escape separate from the smoke and steam, which are allowed to pass out, as usual, through the stack, substantially as is hereinafter described and claimed, and as illustrated in the annexed drawings, making part of this specification, in which—

Figure 1:
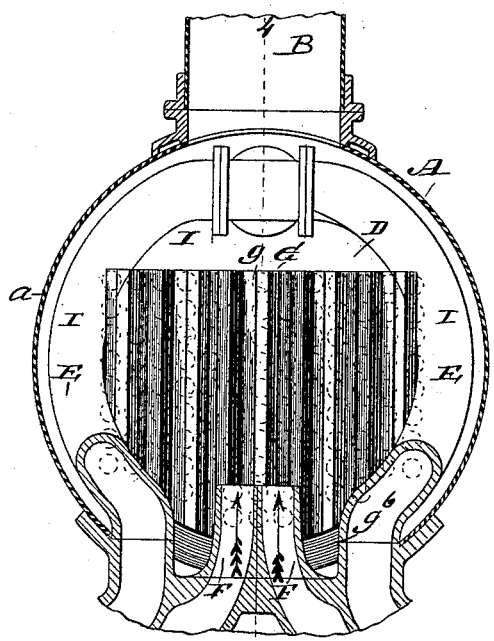
Figure 2:
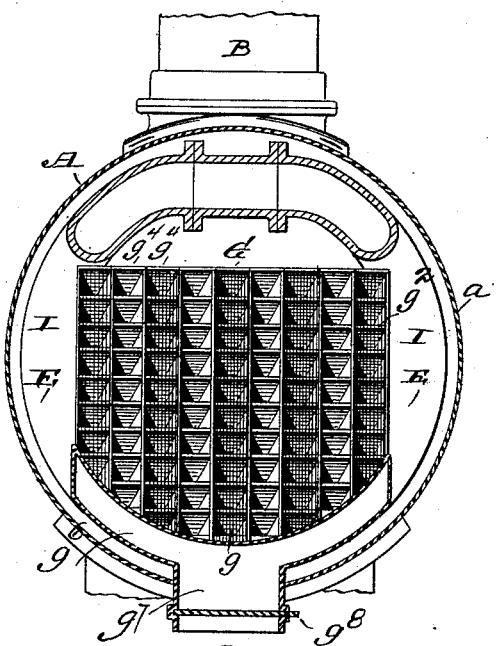
Figure 3:
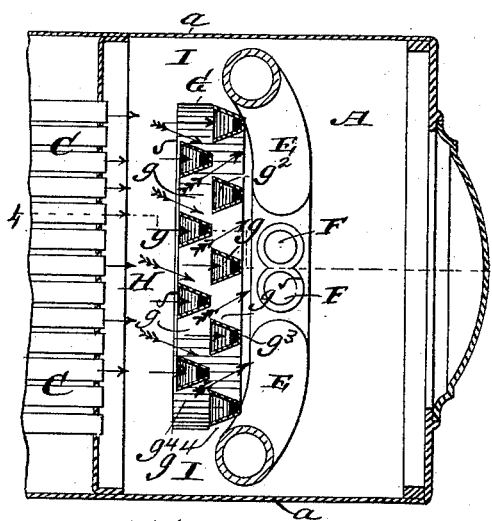
Figure 4:
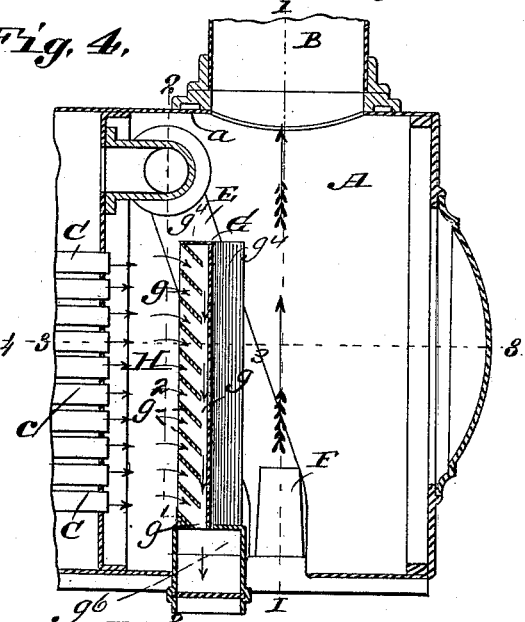

Figure 1 is a vertical cross-section on the line 1 1 of Fig. 4 of a locomotive smoke-arch having the improvement in question; Fig. 2, another vertical cross-section on the line 2 2 of Fig. 4, but looking in the opposite direction—that is, toward the forward end of the arch; Fig. 3, a horizontal section on the line 3 3 of Fig. 4, which in turn is a vertical longitudinal section on the line 4 4 of Fig. 1; Figs. 5 to 8, modifications, Fig. 5 being a vertical cross-section looking forward on the line 5 5 of Fig. 6, which in turn is a vertical longitudinal section on the line 6 6 of Fig. 5; Fig. 7, a vertical cross-section looking forward on the line 7 7 of Fig. 8, which in turn is a longitudinal horizontal section on the line 8 8 of Fig. 7.

The same letters of reference denote the same parts.

The smoke-arch A, stack B, flues C, flue-sheet D, steam-pipes E, and exhaust-nozzles F, as well as the minor parts of that portion of the locomotive with which the improvement is more immediately connected, are of the customary construction, saving as it may be modified or supplemented by the improvement, and as follows:

G represents the deflector for diverting the sparks, as described. Its most desirable form is shown in Figs. 1, 2, 3, and 4. It is located squarely in front of the flues C, but leaving an open space, H, Figs. 3 and 4, between the deflector and flue-sheet D, and an annular or approximately-annular space or passage, I, Figs. 1, 2, and 3, at the sides and top of the deflector between it and the shell *a* of the smoke-arch. The principle of the deflector is that, being in front of the flues, it is directly in the way of the more solid portion—namely, the sparks and cinders—of the matter escaping from the flues, and which, after passing out of the flues, continues, for some distance at least, to move horizontally toward the forward end of the smoke-arch; but by being spaced some distance in front of the flues and not extending entirely to the top and sides of the smoke-arch, or by having openings horizontally or otherwise through it, as presently described, or by having both a space at its sides and top, and also openings through it, it affords opportunity for the more gaseous portion of the matter—namely, the smoke—and which can be influenced by the exhaust, to take a winding course to pass the deflector and escape through the arch to the stack.

The deflector G consists as follows: In line with each vertical row *c* of flues, Fig. 4, is a vertical deflector or chute, $g$, Figs. 1, 2, 3, and 4, in height equal to the flue-row *c*, closed at its top and back, but open toward the flue-row, and preferably made wider toward the flue-row than in the opposite direction, as shown more distinctly in horizontal cross-section in Fig. 3, open at its lower end, $g'$, and preferably having a series of cross-partitions, $g^2$, inclining forward and downward, but leaving a continuous vertical channel, $g^3$, Figs. 3 and 4, at the forward end of the chute $g$. By means of the cross-partitions as many inlets into the chute $g$ may be provided as there are flues in the row *c*. To provide a chute, $g$, for every flue-row *c*, the chutes are arranged in two or more series, $g^4$ $g^4$, the chutes in one of the series being arranged to break joints with those in the other of the series, substantially as shown in Fig. 3, and so as to form passages $g^5$, through which the smoke can pass, as indicated by the arrows in Fig. 3. The chutes $g$ at the lower end connect with or open into a cross-flue, $g^6$, Figs. 2 and 4, which in turn leads into a flue, $g^7$, through which the matter received into the chutes $g$ is ultimately discharged. A gate, $g^8$, Figs. 2 and 4, may be, and preferably is, used to enable the flue $g^7$ to be opened or closed, as desired, so that the matter can be discharged from the locomotive at any suitable points along the road. There may be another chamber (not shown) below the gate $g^8$, with another gate lower down, to enable the matter to be retained therein and delivered therefrom at intervals.

In operation the exhaust steam, which escapes in the ordinary manner, acts to draw the cinders and sparks into the deflector and into the various compartments thereof, as described, and the smoke past the deflector into the stack.

Figure 5:
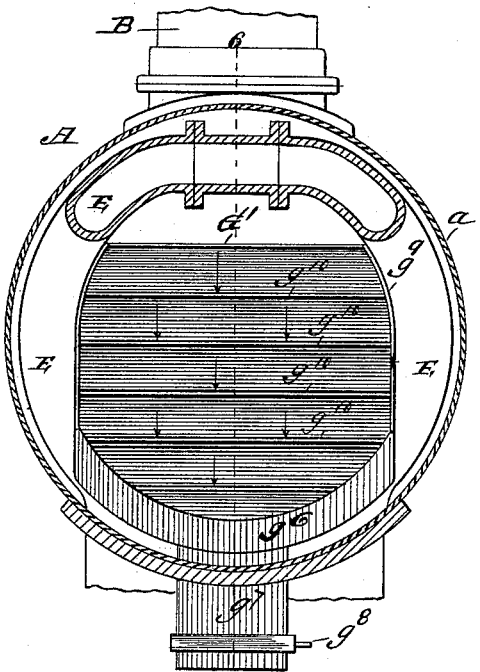
Figure 6:
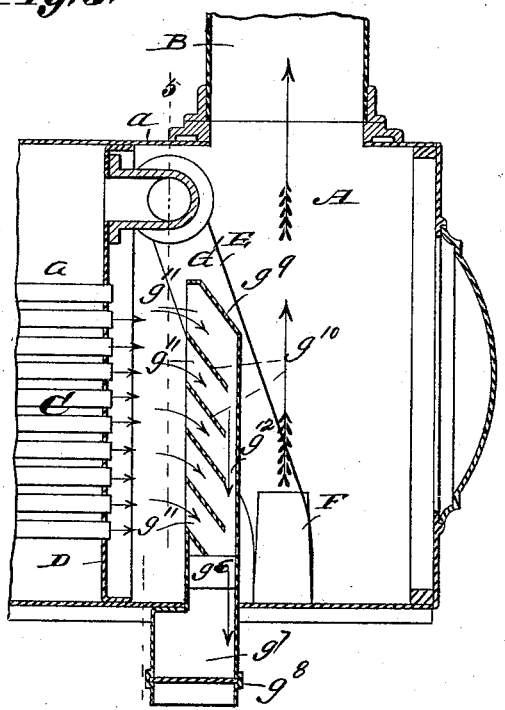
Figure 7:
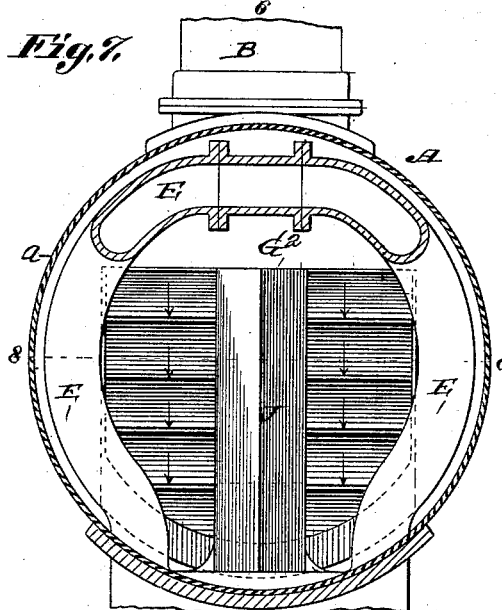

In Figs. 5 and 6 a modification of the deflector is shown. In this respect the deflector G' has no passages through it, and the smoke escapes entirely through the passage I, and the deflector is composed substantially of a case, $g^9$, of about the same exterior outline as that of the deflector G, above described, and open only toward the flue-sheet, and having a series of inclined cross-partitions, $g^{10}$, thereby providing passages $g^{11}$, leading into a vertical chute, $g^{12}$, at the forward end of the deflector, which in turn leads downward into the flue $g^6$, above described. The action of exhaust-steam is substantially the same as in the case of the first-described deflector, G, saving that the smoke is drawn entirely between the case $g^9$ and the shell $a$.

Figure 8:
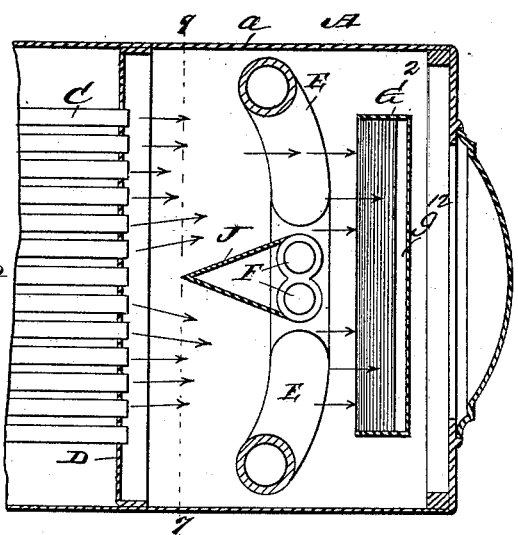

In Figs. 7 and 8 another modification is shown, in this: The deflector $G^2$ is located in front of the exhaust-nozzles instead of in the rear. Its form is preferably like that of the deflector G'. A guard, J, is used in rear of the nozzles F.

It will be observed that the present deflector differs from the perforated screens hitherto in use in locomotive smoke-arches in that the mesh of the screen permits everything smaller than the mesh, whether solid or gaseous, to pass it. On the other hand, when an imperforate diaphragm is used, both the solid and the gaseous portions pass together along or by the diaphragm, whereas in the present instance a solid wall is presented to the solid portion of the matter as it moves out from the flues, but leaving winding passages for the gaseous portion of the matter to pass; and, further, such solid wall is provided with or shaped to form chutes or passages, into which the solid portion of the matter is deflected, and thence into a passage separate from that into which the gaseous portion of the matter passes.

I claim—

1. The combination, in a locomotive, of the boiler-flues, the smoke-arch, and the deflector, said deflector consisting of chutes closed at top and back, but open toward the flue-row, and presenting a continuous surface to the matter proceeding in a right line from said boiler-flues, but having winding passages through or around or both through and around it, substantially as and for the purpose described.

2. The combination, in a locomotive, of the boiler-flues, the smoke arch, and the deflector, said deflector being spaced apart from the flue-sheet, opposed to the boiler-flues, and coextensive with that portion of the flue-sheet occupied by said boiler-flues, and having vertical chutes or passages for receiving and deflecting the more solid portion of the matter coming from the boiler-flues, and having winding passages through or around or both through and around the deflector, substantially as described.

3. The combination, in a locomotive, of the boiler-flues, the smoke-arch, and the deflector, said deflector being opposed to said boiler-flues and coextensive with that portion of the flue-sheet occupied by them, and having vertical chutes or passages for receiving the more solid portion of the matter coming from said boiler-flues and deflecting the same, substantially as described.

4. In a locomotive smoke-arch, the deflector G, having the vertical chutes in two series relatively arranged, as and for the purpose described.

Witness my hand.

ALPHONSE T. CWERDINSKI.

Witnesses:
C. D. MOODY,
B. F. REX.